US012371940B1

(12) United States Patent
Campeau et al.

(10) Patent No.: US 12,371,940 B1
(45) Date of Patent: Jul. 29, 2025

(54) COLLAPSIBLE POCKET DOOR FRAME WITH FOLDING CROSS BRACES

(71) Applicant: Moulure Alexandria Moulding Inc., Alexandria (CA)

(72) Inventors: Marc Campeau, Alexandria (CA); Fuzhong Liu, Alexandria (CA); Jerry Chabot, Alexandria (CA); Luc Titley, Alexandria (CA); Sean Cadney, Alexandria (CA)

( * ) Notice: Subject to any disclaimer, the term of this patent is extended or adjusted under 35 U.S.C. 154(b) by 0 days.

(21) Appl. No.: 18/667,473

(22) Filed: May 17, 2024

(51) Int. Cl.
*E06B 3/46* (2006.01)
*E06B 1/52* (2006.01)

(52) U.S. Cl.
CPC .............. *E06B 1/52* (2013.01); *E06B 3/4654* (2013.01)

(58) Field of Classification Search
CPC .................................................... E05Y 2900/14
See application file for complete search history.

(56) References Cited

U.S. PATENT DOCUMENTS 2,378,666 A * 6/1945 Triller ................... E06B 3/4654 16/95 W
10,648,221 B2 * 5/2020 Liu ....................... E06B 3/4654
2005/0235568 A1 * 10/2005 Holmstrom ............... E05F 7/04 49/372

FOREIGN PATENT DOCUMENTS

WO WO-2020183349 A1 * 9/2020 ............. E05D 15/58

OTHER PUBLICATIONS https://web.archive.org/web/20230609110058/https://www.imperialsupplies.com/browse/hardware/raw-materials/aluminum/aluminum-u-shaped-channel-stock (Year: 2023).*

* cited by examiner

*Primary Examiner* — Marcus Menezes

(57) ABSTRACT

A collapsible pocket door frame is disclosed having a vertically extending vertical gap jamb component, the vertical gap jamb component having a vertically extending first jamb component that is oriented parallel to a vertically extending second jamb component, each of the first jamb component and the second jamb component having a vertically extending proximal surface and a vertically extending distal surface, a vertically extending vertical spine component, the vertical spine component arranged parallel to and spaced apart from the vertical gap jamb component, a plurality of pairs of transverse cross braces, each one of the pair of transverse cross braces having a first cross brace component and a second cross brace component, wherein the each one of the pair of transverse cross braces can be extended from a collapsed position to an installed position.

3 Claims, 6 Drawing Sheets

COLLAPSIBLE POCKET DOOR FRAME WITH FOLDING CROSS BRACES

FIELD

The present invention relates to commercial and residential construction. More specifically, the present invention relates to prefabricated pocket door frames that can be tightly and efficiently packaged yet quickly and easily installed onsite in a predictable and repeatable way, expanded from a collapsed position to an installed position in a single movement, and without requiring any additional mechanical fasteners, assembly or professional expertise during installation.

BACKGROUND

Sliding pocket doors are commonly employed architectural features that offer a way to provide a door for an opening in a confined space that would not permit a traditional swinging door.

Pocket doors require the construction of an effectively false or hollow wall that contains a cavity (i.e.: a "pocket") that can fully receive the sliding door in the opened position so that door is hidden from view. Given the additional complexity that a pocket door presents commercial and residential builders, a number of prefabricated pocket door frame kits have been developed that can be quickly installed without requiring that a carpenter or skilled craftsman design, measure, cut, build and install the frame components on a job-by-job, custom basis.

Accordingly, a number of preassembled pocket door frames have been developed where the pocket door frame is partially assembled and can be collapsed into a stowed position for shipping and storage. For example, the present Applicant's own U.S. Pat. No. 10,648,221 to Liu et al. titled "Compact Adjustable Pocket Door Frame" discloses a partially assembled pocket door frame that can be collapsed into a stowed position for shipping and storage and subsequently expanded and prepared for installation.

Similarly, other knowns references such as Italian Patent Application No. 20190009513A1 to Leoni titled "Kit For The Realization Of A Counter Frame For Retractable Sliding Doors" and U.S. Pat. No. 3,079,650A to Spence titled "Door Frame Structures" both disclose a partially assembled pocket door frame having a vertical gap jamb, a vertical spine, and a number of pairs of cross braces that are each attached to the gap jamb by way of a hinged connection such that the partially preassembled pocket door frame can be collapsed into a stowed position for shipping and storage purposes.

Each of these references disclose a pocket door frame that is only partially preassembled and as such a degree of expertise is required during installation as the pocket door frame must first be expanded, then partially assembled, prepared and subsequently installed in the surrounding wall construction that defines the door opening where the pocket door frame is intended to be installed.

It will be readily appreciated that this installation process will require additional mechanical fasteners, some final assembly and a degree of professional fine tuning and adjustment in order to ensure that all of the vertical frame components are oriented perfectly parallel to one another and orthogonal to the horizontal frame components, and that all opposing components must be perfectly aligned in order to define a door gap having an equidistant width at all points that can ultimately receive a pocket door during final assembly.

It will be further appreciated that these known pocket door frame solutions will require further assembly as otherwise they will simply not collapse into a size that will fit within a standard 8-foot length packaging carton when in a collapsed position. Further to this point, it will be appreciated that most indoor door frames are typically between 7 to 8 feet tall. As such, the vertical components of a typical pocket door frame (for example, the jamb components) will typically be between 7 and 8 feet long.

It will be further appreciated that there are economic advantages that may be realized if a package is 8 feet in length, or less, for international shipping purposes. Similarly, many retail environments have standard 8-foot length shelves, and as such these retailers prefer to stock packages that are ideally 8 feet in length, or less, in order to fit on these standard 8-foot length shelves.

In other words, there are clear advantages if a pocket door frame can be fit within a package that is ideally 8 feet, or less, in length. However, all of the known pocket door frames discussed herein are partially pre-assembled in order to fit within a package of this size, as these known solutions cannot be collapsed to fit within a package that is 8 feet in length or less.

As such, each of these known solutions require a degree of assembly, additional mechanical fasteners, and professional expertise during installation in order to assemble, install and adjust a pocket door frame that is sufficiently orthogonal and which defines a perfectly equidistant gap that can subsequently receive a pocket door in a slidable manner.

Therefore, there is need for a collapsible pocket door frame that can be tightly and efficiently packaged yet quickly and easily installed onsite in a predictable and repeatable way, expanded from a collapsed position to an installed position in a single movement, and without requiring any additional mechanical fasteners, assembly or professional expertise during installation.

BRIEF SUMMARY

The present disclosure provides a collapsible pocket door frame that can be tightly and efficiently packaged yet quickly and easily installed onsite in a predictable and repeatable way, expanded from a collapsed position to an installed position in a single movement, and without requiring any additional mechanical fasteners, assembly or professional expertise during installation.

In at least one embodiment, the present invention provides a collapsible pocket door frame having a vertically extending vertical gap jamb component, the vertical gap jamb component having a vertically extending first jamb component that is oriented parallel to a vertically extending second jamb component, each of the first jamb component and the second jamb component having a vertically extending proximal surface and a vertically extending distal surface, a vertically extending vertical spine component, the vertical spine component arranged parallel to and spaced apart from the vertical gap jamb component, a plurality of pairs of transverse cross braces, each one of the pair of transverse cross braces having a first cross brace component and a second cross brace component, each of the first cross brace component and the second cross brace component having a proximal end and a distal end, the proximal end of the first cross brace component hingedly connected to the distal surface of one of the first jamb component and the second jamb component, the distal end of the second cross brace component hingedly connected to the vertical spine, the distal end of the first transverse component abutting the proximal end of the second transverse component when the transverse cross brace is in an installed position, the first transverse component being collinear with the second transverse component when the transverse cross brace is in the installed position, a longitudinal surface of the first cross brace component abutting a longitudinal surface of the second cross brace component when the transverse cross brace is in a collapsed position, the distal end of the first cross brace component hingedly connected to the proximal end of the second cross brace component, such that each one of the pair of transverse cross braces can be extended from the collapsed position to the installed position in a single movement.

BRIEF DESCRIPTION OF THE DRAWINGS

The present disclosure will be better understood in connection with the following FIGURES, in which.

DETAILED DESCRIPTION OF THE EMBODIMENTS

The present disclosure provides a collapsible pocket door frame that can be tightly and efficiently packaged yet quickly and easily installed onsite in a predictable and repeatable way, expanded from a collapsed position to an installed position in a single movement, and without requiring any additional mechanical fasteners, assembly or professional expertise during installation.

It will be appreciated that all components of the present invention can be formed of any suitable material (including but not limited to wood and laminated veneer lumber ("LVL"), various polymers, composites and plastics, steel, aluminum and other metals) and by any suitable manufacturing processes (including but not limited to extrusion, casting, milling, planing, welding, rolling, and assembly of constituent parts) as required by the end user of the present invention.

Moreover, it will be appreciated that the components of the present invention can be manufactured to any suitable measurements as required by the end user of the present invention.

With reference to FIGS. 1 to 6, at least one embodiment of a compact pocket door frame assembly 10 is illustrated. In this embodiment, compact pocket door frame assembly 10 includes a gap jamb assembly 12, a plurality of transverse cross braces 14 and a vertical spine component 16.

It will be appreciated that gap jamb assembly 12 is both vertically oriented and parallelly oriented and spaced apart from vertical spine component 16. Moreover, it is contemplated that each of the plurality of transverse cross braces 14 extend horizontally between a distal surface of gap jamb assembly 12 and vertical spine component 16.

Figure 1:
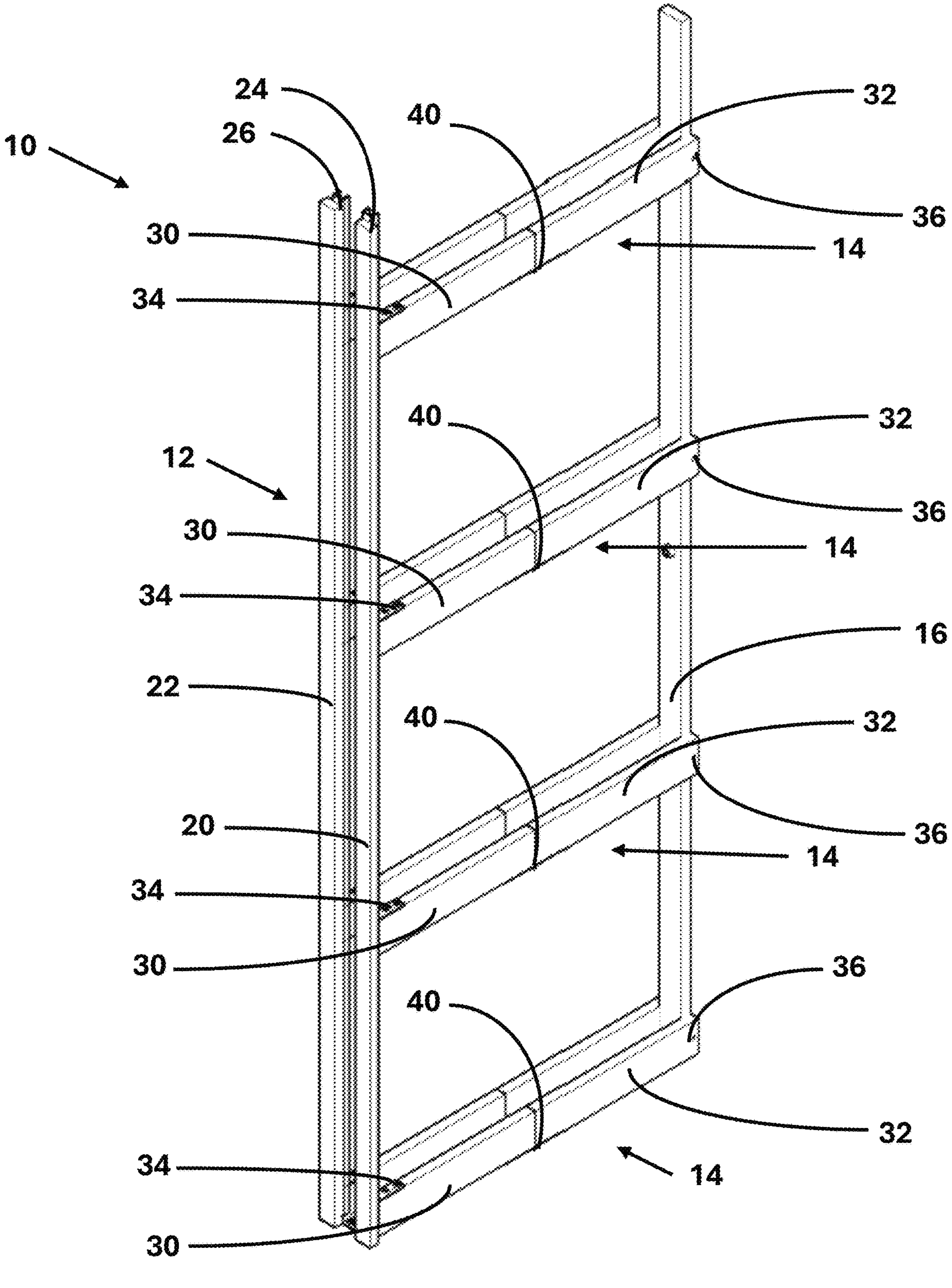
FIG. 1 is an upper perspective view of a collapsible pocket door frame in an installed position in accordance with at least one embodiment of the present invention.
Figure 2:
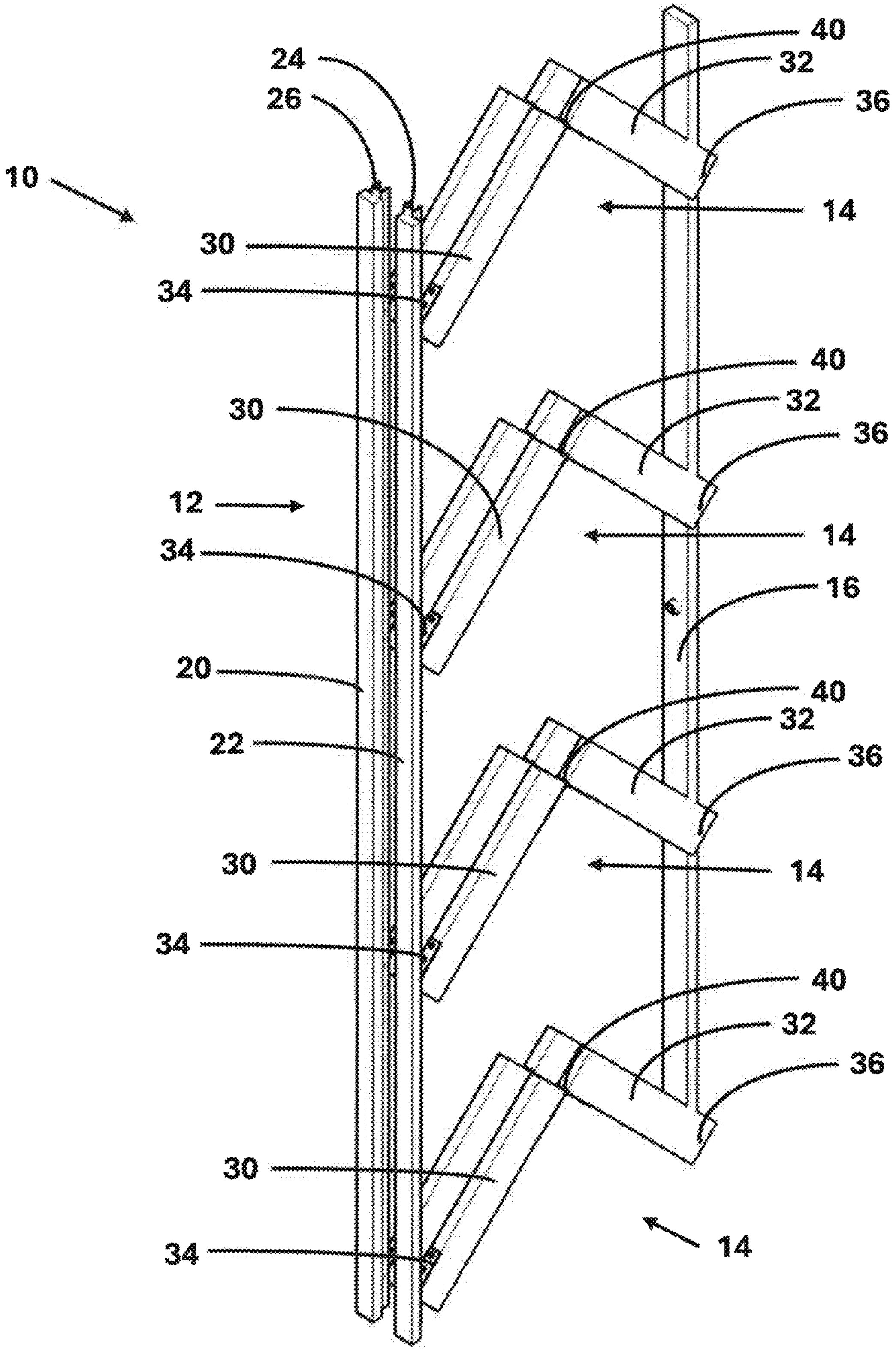
FIG. 2 is an upper perspective view of a collapsible pocket door frame in a partially collapsed intermediary position in accordance with the embodiment of FIG. 1.

It is contemplated that each of the plurality of transverse cross braces 14 are oriented orthogonally relative to the gap jamb assembly 12 and vertical spine component 16 when the compact pocket door frame 10 is in an installed position, as can be seen in FIG. 1 and as will be discussed in further detail herein.

Figure 3:
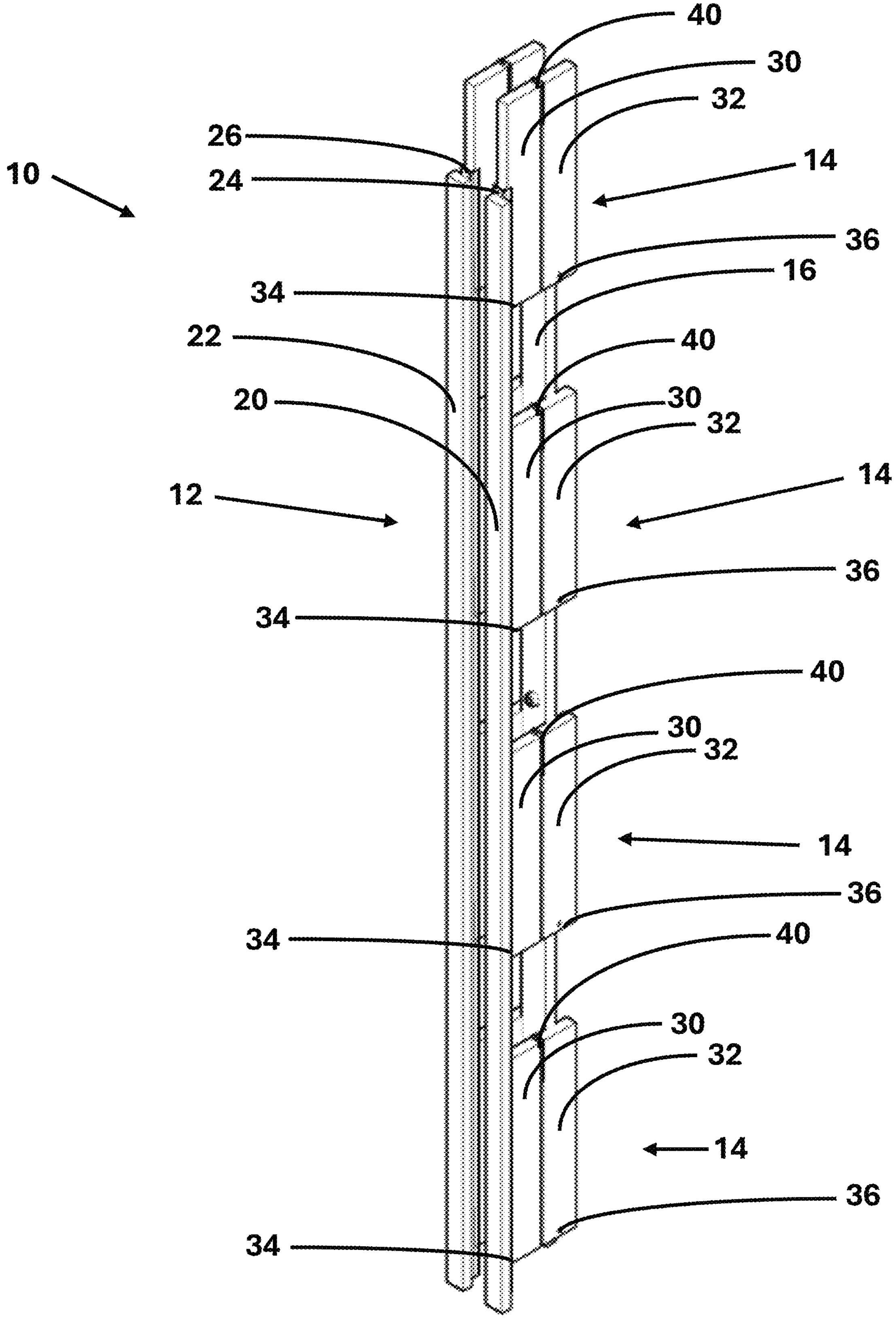
FIG. 3 is an upper perspective view of a collapsible pocked door frame in a collapsed position in accordance with the embodiment of FIG. 1.

It will be further contemplated that each of the plurality of transverse cross braces 14 fold in half and the constituent folded components are oriented parallel relative to the gap jamb assembly 12 and vertical spine component 16 when the compact pocket door frame 10 is in an installed position, as can be seen in FIG. 3 and as will be discussed in further detail herein.

As can be seen in FIG. 1, gap jamb assembly 12 is further comprised of a first gap jamb component 20 that is parallelly oriented and spaced apart from a second gap jamb component 22 in order to define a vertically oriented, longitudinally extending gap therebetween.

Figure 6:
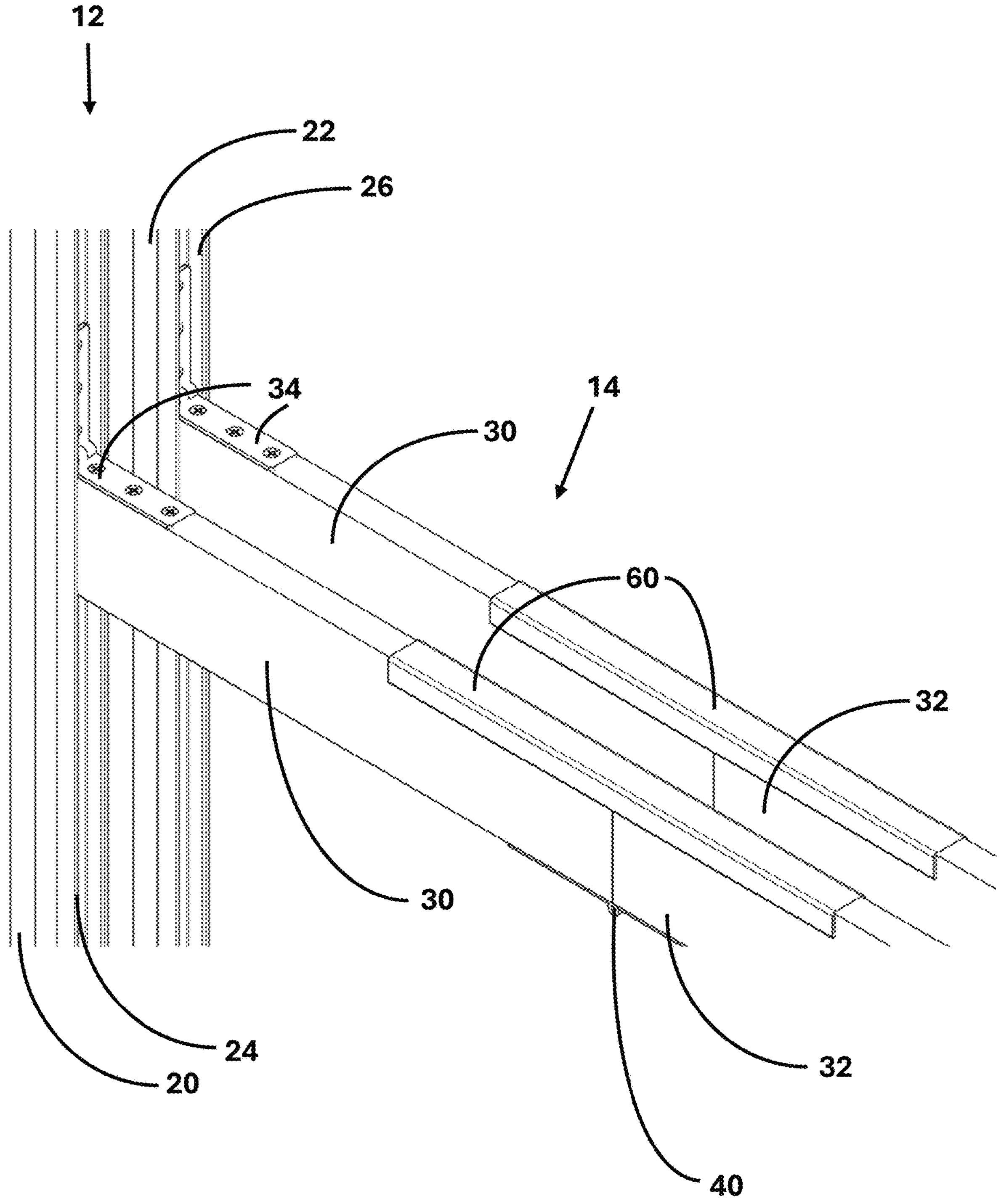
FIG. 6 is another upper perspective close up view of a transverse cross brace assembly in an installed position in accordance with the embodiment of FIG. 1.

Moreover, in some embodiments, it is contemplated that a distal surface of each of first gap jamb component 20 and second gap jamb component 22 can further include a vertically extending stiffener 24, 26, as can also be seen in FIG. 6.

In at least one embodiment, it is contemplated that vertically extending stiffener 24, 26 is a longitudinally extending, "U" shaped channel of extruded aluminum that is secured to the distal surface of the gap jamb component by any suitable means, however other arrangements are also contemplated. It will be appreciated that a "U" shaped channel can have a first flange and second flange disposed between a web, as will be readily understood by a skilled person.

With reference to FIGS. 1 to 6, in at least one embodiment it is contemplated that four opposing pairs of transverse cross braces 14 are provided in compact pocket door assembly 10 and that each of these pairs of transverse cross braces 14 are oriented in an opposed and parallel fashion in the installed position. However, it is contemplated that less or more transverse cross braces 14 may be provided in different embodiments, depending on the needs of the end user of the present invention.

Figure 4:
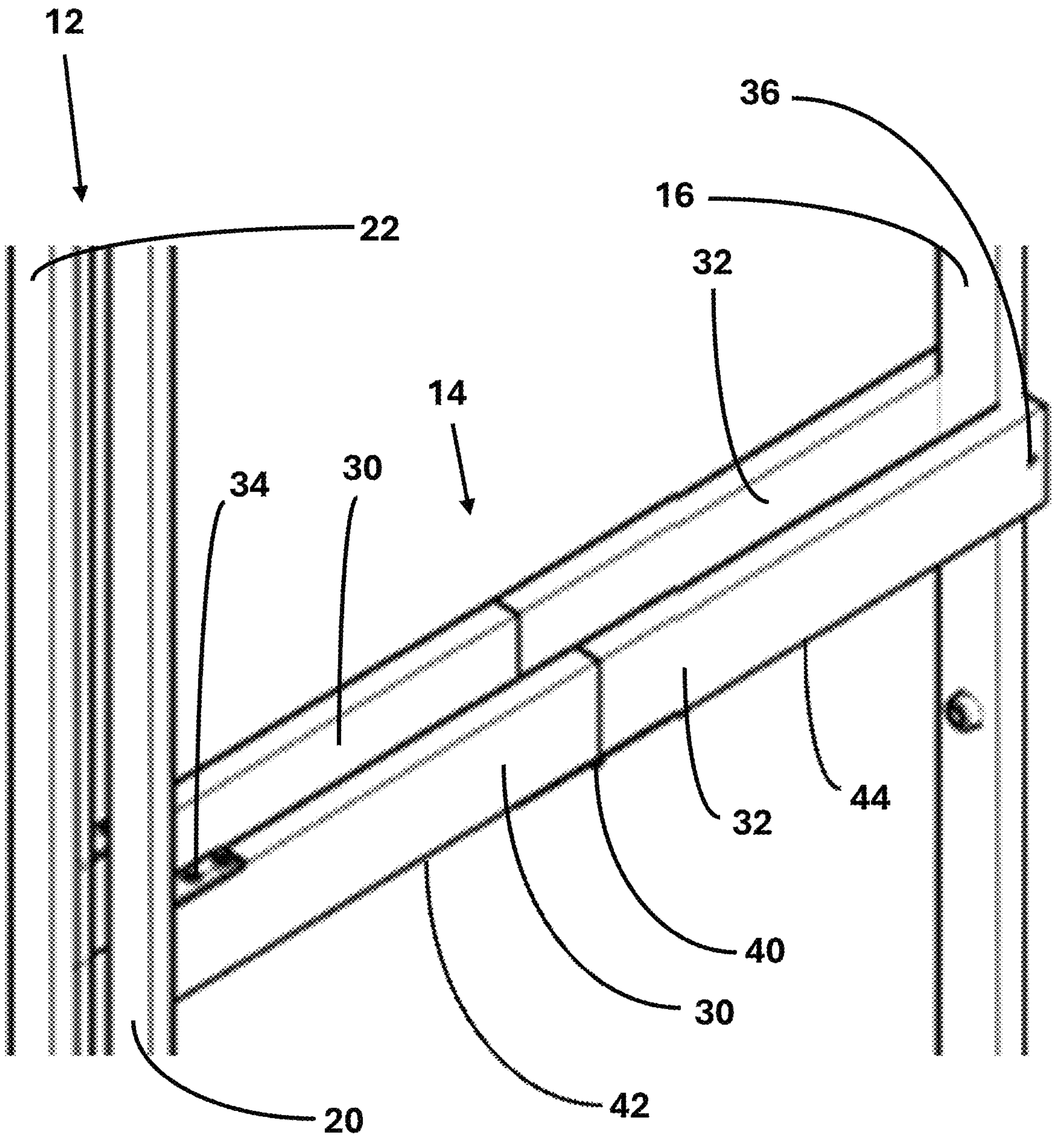
FIG. 4 is an upper perspective close up view of a transverse cross brace assembly in an installed position in accordance with the embodiment of FIG. 1.

With reference to FIGS. 1, 4 and 6, it is contemplated that each transverse cross brace 14 has a first cross brace component 30 and a second cross brace component 32. It is contemplated that first cross brace component 30 is collinearly aligned with second cross brace component 32 when compact pocket door frame 10 is in the installed position, as can be seen in FIGS. 1, 4 and 6.

Moreover, it is contemplated that each transverse cross brace 14 is hingedly connected to a distal surface of gap jamb assembly 12 by way of a hinged connection 34 that is provided at a proximal end of first cross brace component 30 of each transverse cross brace 14, as can also be seen in FIG. 6.

It is also contemplated that a distal end of second cross brace component 32 of each transverse cross brace 14 is pivotally connected to vertical spine component 16 by way of a pivotal connection 36 provided at distal end of second cross brace component 32 of each transverse cross brace 14.

In the context of the present disclosure, it is contemplated that hinged connection 34 can be any suitable hinged connection that allows a proximal end of first cross brace component 30 to be fixed to the distal surface of gap jamb assembly 12 in a fixed yet movable way, such that first cross brace component 30 can be moved from a generally horizontal position in the installed position (as can be seen in FIGS. 1, 4 and 6) to a generally vertical position in the collapsed position (as can be seen in FIG. 3) where the first cross brace component 30 is generally parallel to gap jamb assembly 12 and abuts the distal surface of gap jamb assembly 12.

Examples of suitable hinged connections 34 include, but are not limited to, a hinge, a mechanical pivot point, a mechanical fastener or any other suitable hinged connection that permits first cross brace component 30 to be fixed to the distal surface of gap jamb assembly 12 in a secure but movable way.

In an analogous way, it is contemplated that pivotal connection 36 can be any suitable pivotal connection that allows a distal end of second cross brace component 32 to be fixed to the vertical spine assembly 16 in a fixed yet movable way, such that second cross brace component 32 can be moved, in a single movement, from a generally horizontal position in the installed position (as can be seen in FIGS. 1, 4 and 6) to a generally vertical position in the collapsed position (as can be seen in FIG. 3) where second cross brace component 32 is generally parallel to vertical spine assembly 16.

Examples of suitable pivotal connections 36 include, but are not limited to, a hinge, a mechanical pivot point, a mechanical fastener or any other suitable hinged connection that permits second cross brace component 32 to be fixed to the distal surface of vertical spine assembly 16 in a secure but movable way.

Figure 5:
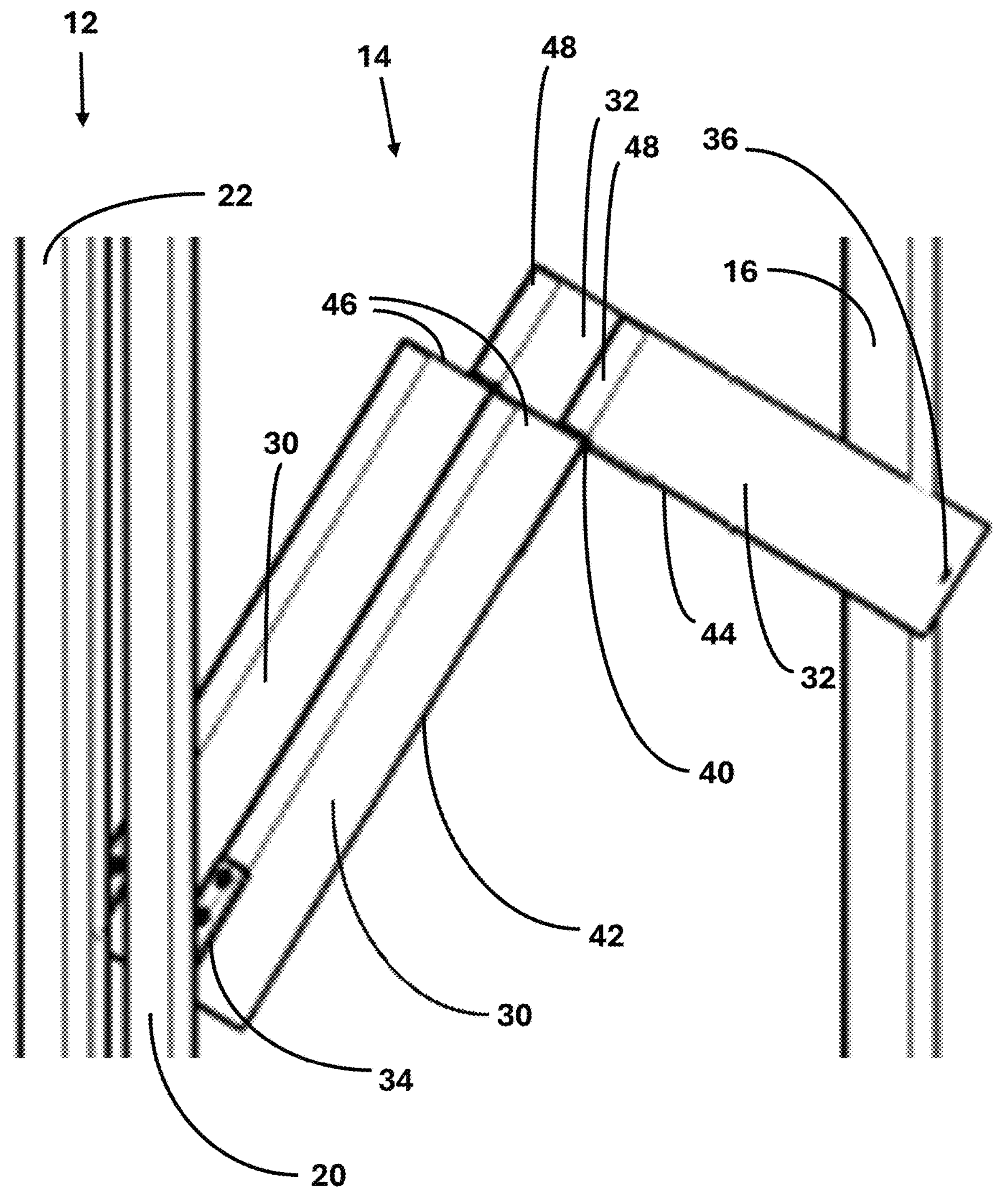
FIG. 5 is an upper perspective close up view of a transverse cross brace assembly in a partially collapsed position in accordance with the embodiment of FIG. 1.

With reference to FIGS. 4, 5 and 6, it is contemplated that first cross brace component 30 of each transverse cross brace 14 is joined to the respective second cross brace component 32 of each transverse cross brace 14 by way of a midpoint hinged connection 40 that is located at an approximate mid-point of each transverse cross brace 14.

More specifically, it is contemplated that a distal end of first cross brace component 30 is hingedly connected to a proximal end of second cross brace component 32 by way of a midpoint hinged connection 40 that permits first cross brace component 30 to colinearly align with second cross brace component 32 in a generally horizontal manner in the installed position (as can be seen in FIGS. 1, 4 and 6), and first cross brace component 30 to parallelly align and abut second cross brace component 32 in a generally vertical manner in the collapsed position (as can be seen in FIG. 3).

More specifically, it is contemplated that each transverse cross beam 14 has a first cross beam component 30 that has a first longitudinal surface 42 and a second cross beam component 32 that has a second longitudinal surface 44 (as can be seen in FIGS. 4 and 5) and that first longitudinal surface 42 and second longitudinal surface 44 are oriented in a parallel and opposed manner where these longitudinal surfaces abut one another in the collapsed position, as can be seen in FIG. 3.

With reference to FIG. 6, in some embodiments, it is contemplated that a horizontally extending stiffening brace 60 is provided that can secure first cross brace component 30 relative to second cross brace component 32 when the transverse cross brace 14 is in the installed position and first cross brace component 30 is oriented collinearly relative to second cross brace component 32.

It will be appreciated that midpoint hinged connection 40, first longitudinal surface 42 and second longitudinal surface 44 may each be located on an upper surface or lower surface of each transverse cross beam 14, depending on the particular needs of the end user.

In any event, it will be appreciated that each of midpoint hinged connection 40, first longitudinal surface 42 and second longitudinal surface 44 will be located on the same surface (either upper or lower) of each transverse cross beam 14 in order to permit the suitable movement between the installed position and the collapsed position, as noted herein and as will be appreciated by the skilled person.

In the context of the present disclosure, it is contemplated that midpoint hinged connection 40 can be any suitable pivotal connection that allows first cross beam component 30 to move relative to second cross beam component 32, as discussed herein. Examples of suitable midpoint hinged connection 40 include, but are not limited to, a hinge, a mechanical pivot point, a mechanical fastener or any other suitable hinged connection that permits first cross beam component 30 to move relative to second cross beam component 32 in a secure but movable way.

It is further contemplated that first cross brace component 30 of each transverse cross brace 14 has a distal end surface 46 and that second cross brace component 32 of each transverse cross brace 14 has a proximal end surface 48, as can be seen in FIG. 5. It is further contemplated that distal end surface 46 of first cross brace component 30 abuts proximal end surface 48 of second cross brace component 32 when the transverse cross brace 14 is positioned generally horizontally in the installed position, as can be seen in FIGS. 1 and 4.

In this way, it is contemplated that compact pocket door assembly 10 can be alternated between an installed position (as seen in FIG. 1) and a collapsed position (as seen in FIG. 3) in a single movement and without requiring a degree of assembly, additional mechanical fasteners, and professional expertise during installation in order to assemble, install and adjust a pocket door frame that is sufficiently orthogonal and which defines a perfectly equidistant gap that can subsequently receive a pocket door in a slidable manner.

Furthermore, it is contemplated that the overall height of the compact pocket door assembly 10 in the installed position (as can be seen in FIG. 1) is the approximately the same as the overall length of the compact pocket door assembly 10 in the collapsed position (as can be seen in FIG. 3). As such, it is contemplated that the present compact pocket door frame 10 can be packaged in a standard 8-foot package (or shorter) in the collapsed position, and therefore can fit efficiently within a shipping container or a standard 8 foot retail shelf, as the case may be.

While the present invention has been described with reference to particular embodiments it will be apparent to anyone skilled in the art that there are many permutations and combinations of combining the primary response variables to achieve particular benefits. All such permutations and combinations are considered to be within the sphere and scope of this invention as defined in the claims appended hereto.

What is claimed is:

1. A collapsible pocket door frame having:

a vertically extending gap jamb component, the gap jamb component having a vertically extending first jamb component that is oriented parallel to a vertically extending second jamb component, each of the first jamb component and the second jamb component having a vertically extending proximal surface and a vertically extending distal surface;

a vertically extending spine component, the spine component arranged parallel to and spaced apart from the gap jamb component; and a plurality of pairs of transverse cross braces, each one of the pair of transverse cross braces having:

a first cross brace component and a second cross brace component, each of the first cross brace component and the second cross brace component having a proximal end and a distal end, the proximal end of the first cross brace component having a flat surface and hingedly connected to the distal surface of one of the first jamb component and the second jamb component, the distal end of the second cross brace component hingedly connected to the spine component, the proximal end of the second cross brace component having a flat surface, the distal end of the first cross brace component having a flat surface and hingedly connected to the proximal end of the second cross brace component, the flat surface of the distal end of the first cross brace component abutting the flat surface of the proximal end of the second cross brace component when the transverse cross brace is in an installed position, the flat surface of the proximal end of the first cross brace component abutting the distal surface of one of the first jamb component and the second jamb component when the transverse cross brace is in the installed position, the first cross brace component being collinear with the second cross brace component when the transverse cross brace is in the installed position, a longitudinal surface of the first cross brace component abutting a longitudinal surface of the second cross brace component when the transverse cross brace is in a collapsed position, wherein the each one of the pair of transverse cross braces can be extended from the collapsed position to the installed position in a single movement.

2. The collapsible pocket door frame of claim 1 wherein each one of the pair of transverse cross braces further comprises a horizontally extending stiffening brace, the stiffening brace receiving the transverse cross brace in the installed position.

3. The collapsible pocket door frame of claim 1 wherein at least one of the first jamb component and the second jamb component further comprises a vertically extending stiffener, the stiffener having a vertically extending first flange, a vertically extending second flange and a vertically extending web, the web abutting the distal surface of the at least one of the first jamb component and the second jamb component, the proximal end of the first cross brace component hingedly connected to the web.

* * * * *